(12) United States Patent
Goldman

(10) Patent No.: US 7,938,276 B2
(45) Date of Patent: May 10, 2011

(54) FILTRATION ARCHITECTURE FOR OPTIMIZED PERFORMANCE

(75) Inventor: Michael A. Goldman, Sunrise, FL (US)

(73) Assignee: Mechanical Manufacturing Corporation, Sunrise, FL (US)

(*) Notice: Subject to any disclaimer, the term of this patent is extended or adjusted under 35 U.S.C. 154(b) by 64 days.

(21) Appl. No.: 11/344,889

(22) Filed: Feb. 1, 2006

(65) Prior Publication Data

US 2007/0175817 A1 Aug. 2, 2007

(51) Int. Cl.
*B01D 29/11* (2006.01)
*B01D 29/27* (2006.01)
*B01D 39/16* (2006.01)
*B01D 29/00* (2006.01)
*B01D 39/00* (2006.01)

(52) U.S. Cl. .......... 210/497.01; 210/499; 210/502.1

(58) Field of Classification Search .......... None
See application file for complete search history.

(56) References Cited

U.S. PATENT DOCUMENTS

| | | | |
|---|---|---|---|
| 2,386,684 A | 10/1945 | Hermanson | |
| 3,260,370 A * | 7/1966 | Schwartzwalder | 210/489 |
| 3,787,277 A * | 1/1974 | Oomen et al. | 442/8 |
| 4,181,514 A * | 1/1980 | Lefkowitz et al. | 210/504 |
| 4,594,162 A | 6/1986 | Berger | |
| 4,842,739 A | 6/1989 | Tang | |
| 4,863,602 A | 9/1989 | Johnson | |
| 4,921,606 A | 5/1990 | Goldman | |
| 5,053,125 A * | 10/1991 | Willinger et al. | 210/167.22 |
| 5,246,581 A | 9/1993 | Goldman | |
| 5,755,962 A * | 5/1998 | Gershenson et al. | 210/452 |
| 5,762,797 A * | 6/1998 | Patrick et al. | 210/497.1 |
| 5,770,077 A | 6/1998 | Goldman | |
| 5,910,247 A | 6/1999 | Outterside | |
| 6,110,249 A * | 8/2000 | Medcalf et al. | 55/514 |
| 6,274,041 B1 * | 8/2001 | Williamson et al. | 210/243 |
| 6,371,645 B1 | 4/2002 | Rusert et al. | |
| 6,391,200 B2 | 5/2002 | Pulek et al. | |
| 6,692,637 B2 * | 2/2004 | Fox et al. | 210/167.22 |
| 6,726,751 B2 * | 4/2004 | Bause et al. | 210/503 |
| 6,746,760 B2 | 6/2004 | Minemura et al. | |
| 6,908,550 B2 | 6/2005 | Silverstein | |
| 6,966,939 B2 | 11/2005 | Rammig et al. | |

(Continued)

FOREIGN PATENT DOCUMENTS

WO WO-91/08037 6/1991

(Continued)

*Primary Examiner* — In Suk Bullock
*Assistant Examiner* — Madeline Gonzalez
(74) *Attorney, Agent, or Firm* — Fox Rothschild, LLP; Robert J. Sacco

(57) ABSTRACT

A filter bag for use in a liquid filtering system is provided. The filter bag comprises a filtration layer. The filtration layer is defined by one or more filter mediums. The filter mediums can be composed of an adsorbent material disposed between two thin wall substrates. The adsorbent material can be a granular activated carbon. The thin wall substrates can be selected to be highly porous thin wall substrates. The filter bag can further comprise one or more diffusion mediums. The diffusion mediums can be defined by a woven or a non-woven mesh material. The mesh material can be selected from a suitable material that is temperature and fluid compatible with the filtering application to be carried out. The filter bag can include alternating layers of medium having one or more filter mediums and one or more diffusion mediums.

16 Claims, 3 Drawing Sheets

U.S. PATENT DOCUMENTS

| | | |
|---|---|---|
| 6,998,155 B2 | 2/2006 | Haggquist et al. |
| 2001/0004061 A1 | 6/2001 | Popoff et al. |
| 2006/0096910 A1* | 5/2006 | Brownstein et al. .......... 210/490 |
| 2006/0231480 A1 | 10/2006 | Palacios Donaque |
| 2009/0107930 A1 | 4/2009 | Goldman |

FOREIGN PATENT DOCUMENTS

| | | |
|---|---|---|
| WO | WO-02/095112 | 11/2002 |
| WO | WO-03/045532 | 6/2003 |

* cited by examiner

FILTRATION ARCHITECTURE FOR OPTIMIZED PERFORMANCE

BACKGROUND OF THE INVENTION

1. Statement of the Technical Field

The invention concerns filtration equipment, specifically, filter bags used for such acts as removing organic contaminants, color, odor, or even chlorination from fluids.

2. Description of the Related Art

A filter typically consists of a cartridge or a bag for use in a pressurized filter system. A pressurized filter system utilizing filter bags is typically comprised of a filter housing having a body and a cover. The body contains a filter basket for placing the filter bag therein. The filter housing is comprised of a mounting stand, an input orifice, and an output orifice. A contaminated fluid is pumped into the filter housing through the input orifice. The contaminated fluid is filtered as it flows through the filter bag and then exists through the output orifice. Such a pressurized filter system is disclosed in U.S. Pat. No. 5,246,581.

A filter bag is typically composed of one or more layers of filtering medium. The filtering medium is typically made of a micro-fiber material having pores to control fluid flow. The layers of filtering medium can have a uniform pore structure, a graded pore structure, or a tapered pore structure. A tapered or graded pore structure provides a filtering material whereby the pore size decreases in the direction of fluid flow, i.e. from the input orifice to the output orifice. A multi-layer filter structure provides a filtering system able to collect contaminants at each layer of filtering medium.

Filter bags having a multi-layer filter structure typically become ineffective when contaminants are primarily collected at one layer. When contaminants are primarily collected at one layer, an inefficient fluid distribution over the filtering medium results. Also contributing to inefficiency is the decrease in the fluid flow rate through the filter bag. In such a situation, the filter bags life span is shortened.

Despite the various configurations known in the art there remains a need for a filter bag design which increases the efficiency of the filter material. A filter bag design is also needed which optimally enhances fluid flow while providing an extended life span.

SUMMARY OF THE INVENTION

The invention concerns a filter bag for use in a liquid filtering system. The filter bag can comprise a filtration layer. The filtration layer can be defined by one or more filter mediums. The filter mediums can be defined by an adsorbent material disposed between two or more thin wall substrates. According to an embodiment of the invention, the adsorbent material can be a granular activated carbon. The thin wall substrates can be highly porous thin wall substrates.

According to another embodiment of the invention, the filtration layer can be further defined by one or more diffusion mediums. The diffusion mediums can be made from a suitable material that is temperature and fluid compatible with a filtering application to be carried out. For example, the diffusion medium can comprise a thermoplastic having polypropylene, nylon, or polyester. The diffusion medium can be defined by a woven or non-woven mesh material.

According to another embodiment of the invention, the filtration layer can be defined by alternating layers of medium including one or more filter mediums and one or more diffusion mediums. The filter mediums and the diffusion mediums can be joined using ultrasonic welding.

According to another embodiment of the invention, the filter bag can further comprise a pre-filtration layer. The pre-filtration layer can be defined by one or more pre-filtering mediums. The pre-filtering mediums can be defined by an adsorbent material disposed between two or more thin wall substrates. The adsorbent material can be a granular activated carbon.

According to another embodiment of the invention, the pre-filtering mediums can be further defined by one or more diffusion mediums. The diffusion mediums can be defined by a mesh material. The mesh material can be a woven or a non-woven mesh material. According to another embodiment of the invention, the pre-filtration layer can be defined by alternating layers of medium including one or more pre-filtering mediums and one or more diffusion mediums.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
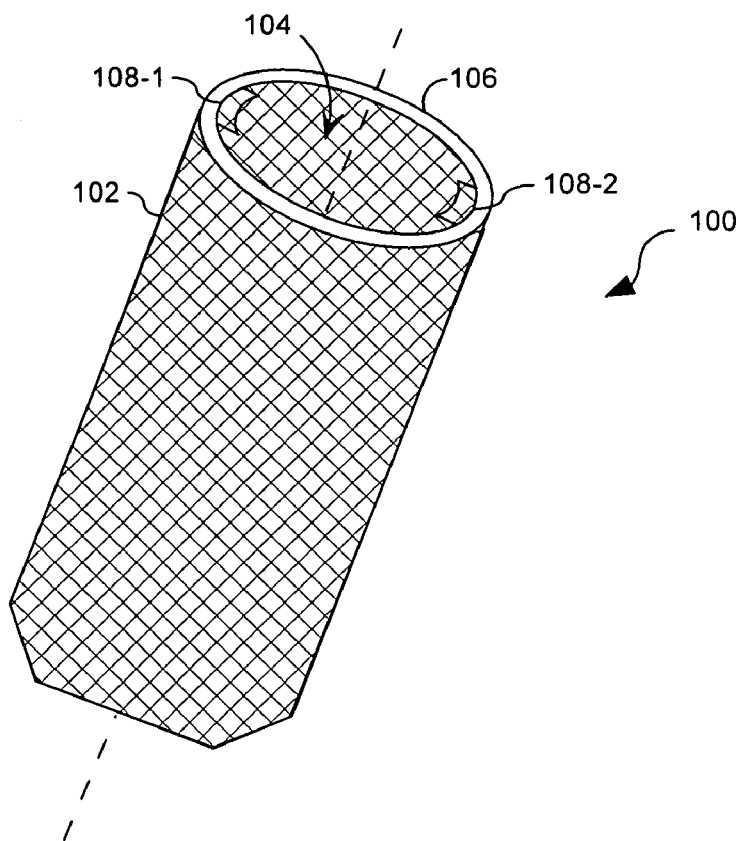
FIG. 1 is a perspective view of a conventional filter bag including a bag member affixed to a ring member.

FIG. 1 is a perspective view of a conventional filter bag including a filter material affixed to a ring member. A contaminated fluid is typically pumped into the filter bag 100 through the input orifice 104. The fluid flows through the filter bag 100 to produce a filtered fluid.

The filter bag 100 includes a bag member 102 and a ring member 106. The bag member 102 is composed of a filter material. The filter material typically comprises one or more layers of filtering medium having a number of pores to control fluid flow. The filtering medium is selected to comprise a material that is suitable for a particular filtration application, such as a micro-fiber (e.g. a polyester, polypropylene, fiberglass, polyamide, or fluorocarbon) or a monofilament (e.g. a nylon or a polypropylene monofilament). The filter material typically comprises an identical pore structure, a graded pore structure, or a tapered pore structure. A tapered or graded pore structure provides a filter material whereby a pore size can decrease in the direction of fluid flow, i.e. from an input orifice 104 through the filter bag 100. The ring member 106 comprises one or more handles 108-1, 108-2. The ring member 106 is made of a semi-rigid material, e.g. a thermoplastic.

A person skilled in the art will appreciate that the filter bag architecture is one embodiment of a filter bag in which the methods described below can be implemented. However, the invention is not limited in this regard and any other suitable filter bag architecture can be used without limitation.

Figure 2:
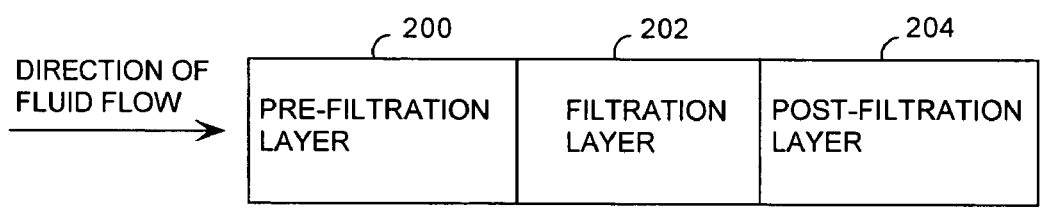
FIG. 2 is a diagram that is useful for understanding the various types of filter materials that can be used to form a conventional bag member.

FIG. 2 is a diagram that is useful for understanding the structure of a filter material forming a conventional bag member 102. The bag member 102 typically comprises a pre-filtration layer 200, a filtration layer 202, and a post-filtration layer 204. Each layer 200, 202, 204 is co-extensive with the surface area of the bag member 102. The pre-filtration layer 200 is the inside layer, and thus would be the inside of bag member 102. The pre-filtration layer 200 is referred to as the upstream layer. The post-filtration layer 204 is the outside layer, and thus would be the outside of bag member 102. The post-filtration layer 204 is referred to as the downstream layer. The pre-filtration layer 200, the filtration layer 202, and the post-filtration layer 204 are typically joined to each other. For example, the pre-filtration layer 200, the filtration layer 202, and the post-filtration layer 204 can be joined using an ultrasonic welding technique.

The pre-filtration layer 200 typically includes a pre-filter material. The pre-filter material comprises one or more layers of a pre-filtering medium. The pre-filtering medium often comprises a monofilament (e.g. nylon monofilament) and/or a micro-fiber (e.g. a polypropylene micro-fiber). The pre-filtration layer 200 acts as a strainer (i.e. collects large particles from a fluid being pumped through the bag member 102).

The filtration layer 202 typically includes a filter material. The filter material comprises one or more layers of a filtering medium. The filtering medium can be selected to include an absolute-rated micro-fiber (i.e. a material that can collect particles equal to or larger than its micron rating). The filtering medium can also be selected to include synthetic fibers, e.g., polyester or polypropylene. The filtering medium collects particles of contaminants from a fluid being pumped through the bag member 102.

The filtration layer 202 can also include a support medium. The support medium is a structural layer often composed of a monofilament, such as a polypropylene monofilament. The support medium is commonly joined to the filter material. For example, the support medium can be joined to the filter material using an ultrasonic welding technique. The support medium provides structural support to the bag member 102 for sustaining high pressure fluid flow.

The post-filtration layer 204 typically comprises a support jacket. The support jacket is often composed of a fibrous fabric, such as a non-woven spunbond material. The support jacket provides support to the bag member 102 and prevents fiber migration downstream.

Figure 3:
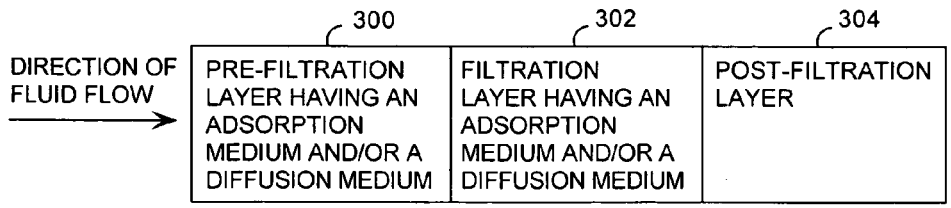
FIG. 3 is a diagram that is useful for understanding the various types of filter materials that can be used to form a filter bag according to an embodiment of the invention.

FIG. 3 is a diagram that is useful for understanding the structure of a filter material that can be used to form a filter bag similar to bag member 102 according to an embodiment of the invention. The filter bag can comprise a pre-filtration layer 300, a filtration layer 302, and a post-filtration layer 304. Each layer 300, 302, 304 can be co-extensive with an entire surface area of the filter bag. The pre-filtration layer 300 is the inside layer, and thus would be the inside of the filter bag. The pre-filtration layer 300 can be referred to as the upstream layer. The post-filtration layer 304 is the outside layer, and thus would be the outside of the filter bag. The post-filtration layer 304 can be referred to as the downstream layer. The pre-filtration layer 300, the filtration layer 302, and the post-filtration layer 304 can be joined to each other. For example, the pre-filtration layer 300, the filtration layer 302, and the post-filtration layer 304 can be joined using an ultrasonic welding technique.

The pre-filtration layer 300 can include a pre-filter material which can be co-extensive with an entire surface area of the filter bag. The pre-filter material can comprise one or more layers of a pre-filtering medium. The pre-filtering medium can comprise a monofilament (e.g. nylon monofilament) and/or a micro-fiber (e.g. a polypropylene micro-fiber). The pre-filtration layer 300 can collect large particles from a fluid being pumped through the filter bag.

The pre-filtration material can further comprise one or more layers of an adsorbent medium for removing chlorine, odor, sediment, or other organic contaminants from a fluid. The adsorbent medium will be described in great detail below. The pre-filtration material can also include one or more layers of a diffusion medium to act as spacers between the layers of a pre-filtering medium and/or an adsorbent medium. The diffusion medium will be described in great detail below.

The filtration layer 302 can include a filter material which can be co-extensive with an entire surface area of the filter bag. The filter material can comprise one or more layers of a filtering medium. The filtering medium can be selected to include an absolute-rated micro-fiber. The filtering medium can also be selected to include synthetic fibers, e.g., polyester or polypropylene. The filtering medium can collect particles of contaminants from a fluid being pumped through the filter bag.

The filter material can further comprise one or more layers of an adsorbent medium for removing organic contaminants from a fluid. The adsorbent medium will be described in great detail below. The filter material can also include one or more layers of a diffusion medium to act as spacers between the layers of a filtering medium and/or an adsorbent medium. The diffusion medium will be described in great detail below.

The filtration layer 302 can also include a support medium which can be co-extensive with an entire surface area of the filter bag. The support medium can be a structural layer composed of a monofilament, such as a polypropylene monofilament. The support medium can be joined to the filter material. For example, the support medium can be joined to the filter material using an ultrasonic welding technique. The support medium can provide structural support to the filter bag for sustaining high pressure fluid flow.

The post-filtration layer 304 can comprise a support jacket which can be co-extensive with the surface area of the filter bag. For example, the support jacket can be composed of a fibrous fabric, such as a non-woven spunbond material. The support jacket can provide support to the filter bag and prevent fiber migration downstream.

A person skilled in the art will appreciate that the filter bag architecture is one embodiment of a filter bag having an adsorbent medium and/or a diffusion medium, which are co-extensive with the surface area of the filter bag. However, the invention is not limited in this regard and any other suitable filter bag architecture having an adsorbent medium and/or a diffusion medium, which are co-extensive with the surface area of the filter bag, can be used without limitation.

Adsorbent Medium

Figure 4:
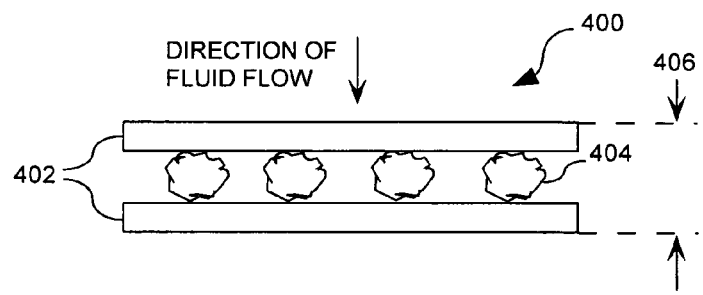
FIG. 4 is an illustration of a filter medium composed of a granular material disposed between thin wall substrates according to an embodiment of the invention.

FIG. 4 is an illustration of an adsorbent medium composed of a granular material disposed between thin wall substrates. The adsorbent medium can be fixed between the thin wall substrates or embedded in fibers of the thin wall substrates using any physically restrictive method commonly used in the art for manufacturing an adsorbent medium, such as a wet bonding technique, a heat bonding technique, an entangling method, or a pressure bonding technique.

According to an embodiment of the invention, the granular material can be fixed between the thin wall substrates using a pressure bonding technique. Still, those skilled in the art will appreciate that the invention is not limited in this regard. The physically restrictive method can be selected in accordance with a particular filtration application.

The adsorbent medium 400 can be any material capable of removing chlorine, odors, sediment, or other organic or non-organic contaminant from a fluid being pumped through the filter bag. For example, the adsorbent medium 400 can remove minute quantities of solids, such as heavy metals, from an influent stream of fluid.

The adsorbent medium 400 can comprise thin walled substrates 402 and a granular material 404. The thin walled substrates 402 can be co-extensive with an entire surface area of the filter material forming a filter bag. The thin walled substrates 402 can be selected to include a micro-fiber substrate. The micro-fiber substrate can be formed of any suitable material, such as polyester, polypropylene, fiberglass, polyamide, or fluorocarbon. The micro-fiber substrate can be selected to include fibers with identical or varying diameters. The thin walled substrate can also be selected as a highly porous substrate to control fluid flow through the adsorbent medium 400 (i.e. selected to have pores substantially larger than a contaminant to be filtered from a contaminated fluid). The adsorbent medium's 400 thickness 406 can be selected to provide for maximum efficiency (i.e. provide for a suitable contact time for contaminants to come in contact with an adsorbent material when pumped through the filter bag).

According to an embodiment of the invention, the adsorbent medium 400 can comprise a thickness 406 less than or equal to one and a half (1.5) millimeters (59 mils). Still, the invention is not limited in this regard. A person skilled in the art will appreciate that the thickness 406 of the adsorbent medium 400 can be selected for a particular filtration application.

The granular material can be selected to include activated carbon. Activated carbon can remove dissolved organic contaminants from liquids through adsorption (i.e. the organic contaminants attach to the activated carbon by chemical attraction). Activated carbon can also remove contaminants that affect liquid color and liquid odor through adsorption. The activated carbon can be selected to have a large surface area for providing bonding sites for contaminant adsorption. The amount of activated carbon disposed between the thin walled substrates can be selected to provide an increased life span of the filter bag. For example, a large amount of activated carbon can provide an increased surface area for contaminant adsorption such that the activated carbon will not be depleted within a short amount of time, such as in days or weeks.

According to an embodiment of the invention, the granular material can be less than or equal to one (1) millimeter in size. Still, those skilled in the art will appreciate that the invention is not limited in this regard. The size of the granular material can be selected in accordance with the particular filtration application.

A person skilled in the art will appreciate that the granular material including activated carbon is one embodiment of a granular material. For example, the granular material can be selected to include activated carbon blended to another adsorbent material, such as activated charcoal.

A person skilled in the art will appreciate that the adsorbent medium 400 is an embodiment of an adsorbent medium having a granular material disposed between thin walled substrates. The invention is not limited in this regard and any other adsorbent medium having a granular material disposed between thin walled substrates can be used without limitation.

Diffusion Medium

Figures 5A, 5B:
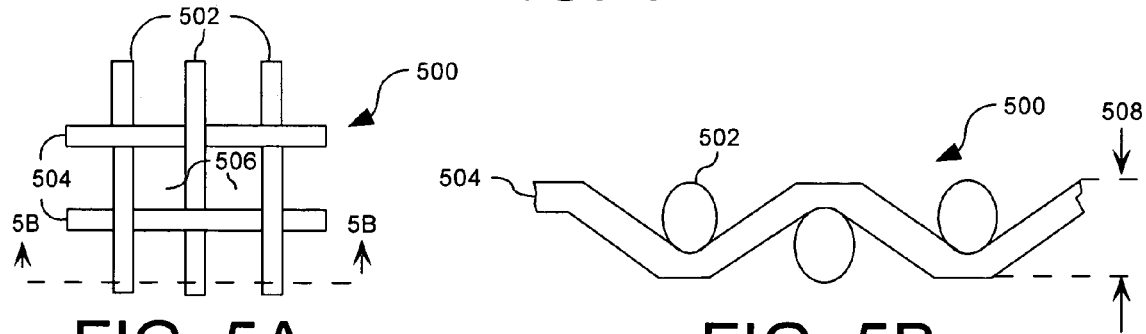
FIG. 5A is a greatly enlarged top view of a woven diffusion medium according to an embodiment of the invention.
FIG. 5B is a greatly enlarged cross-section of a woven diffusion medium according to an embodiment of the invention.

FIG. 5A is a greatly enlarged top view of a woven diffusion medium 500 according to an embodiment of the invention. FIG. 5B is a greatly enlarged cross-section of a diffusion medium 500. Diffusion medium 500 can increase the life span of a filter bag by providing an increased surface area for collection of contaminants between layers of filtering medium. By increasing the surface area for collection of contaminants between layers of medium, diffusion medium 500 can increase fluid flow through the filter bag. Diffusion medium 500 can also provide structural support to the filter bag.

The diffusion medium 500 can be made from any suitable material that is temperature and fluid compatible with the filtering application to be carried out. For example, the diffusion medium 500 can be made of a thermoplastic having polypropylene for low temperature filtering applications. The diffusion medium 500 can be made of a thermoplastic having nylon for high temperature filtering applications. The diffusion medium 500 can be composed of a mesh material.

Referring now to FIG. 5A, diffusion medium 500 can include one or more parallel horizontal strands 504 and one or more parallel vertical strands 502. The horizontal strands 504 and the vertical strands 502 can be interlaced to form a woven mesh material having passages 506. The passages 506 can be selected to be substantially larger than a contaminant to be filtered from a contaminated fluid.

According to an embodiment of the invention, the diffusion medium 500 can comprise a thickness 508 of one (1) millimeter (39.3701 mils). The diffusion medium 500 can comprise thirty-four (34) strands 502, 504 per inch. The passages 506 can have a width and height of one (1) millimeter (39.3701 mils). Still, those skilled in the art will appreciate that the invention is not limited in this regard. The thickness, strands per inch, and the size of the passages 506 can be selected in accordance with the particular filtration application.

Methods can be employed to prevent fraying at the edges of the woven mesh material. Methods for prevention of fraying are well known to persons skilled in the art. Thus, such methods will not be described in great detail herein.

A person skilled in the art will appreciate that the diffusion medium 500 is an embodiment of a woven diffusion medium. The invention is not limited in this regard and any other woven diffusion medium can be used without limitation.

Figures 5C, 5D:
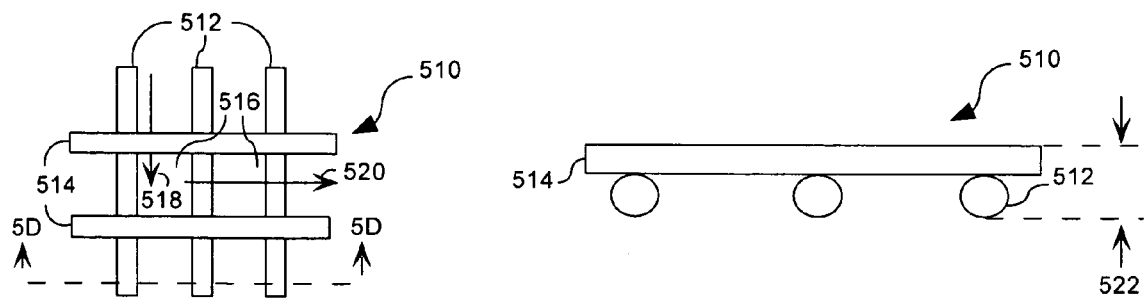
FIG. 5C is a greatly enlarged top view of a non-woven diffusion medium according to an embodiment of the invention.
FIG. 5D is a greatly enlarged cross-section of a non-woven diffusion medium according to an embodiment of the invention.

FIG. 5C is a greatly enlarged top view of a non-woven diffusion medium 510 according to an embodiment of the invention. FIG. 5D is a greatly enlarged cross-section of a diffusion medium 510. Diffusion medium 510 can have the same or similar benefits as those described above with regards to the diffusion medium 500. However, diffusion medium 510 can also increase fluid flow through the filter bag 100 by providing lateral openings, which will be described in great detail below.

Similar to the woven diffusion medium 500, diffusion medium 510 can be made from a suitable material that is temperature and fluid compatible with the filtering application to be carried out. For example, diffusion medium 510 can be composed of a thermoplastic including a fiber (e.g. polypropylene, nylon, or polyester). Diffusion medium 500 can be selected to include a non-woven mesh material.

Referring now to FIG. 5C, diffusion medium 500 can include a first plane of horizontally spaced apart parallel strands 514. The diffusion medium 500 can also include a second plane of vertically spaced apart parallel strands 512. The strands 512 on the second plane can be oriented such that they are not parallel (for example, perpendicular) to the strands 514 on the first plane. This orientation forms lateral openings 518, 520 and passages 516 for fluid flow. The passages 516 can be selected to be substantially larger than any contaminant to be filtered from a contaminated fluid.

According to an embodiment of the invention, the diffusion medium 510 can comprise a thickness 522 of one (1) millimeter (39.3701 mils). The diffusion medium 510 can comprise thirty-four (34) strands 512, 514 per inch. The passages 516 can have a width and height of one (1) millimeter (39.3701 mils). Still, those skilled in the art will appreciate that the invention is not limited in this regard. The thickness, strands per inch, and the size of the passages 516 can be selected in accordance with the particular filtration application.

A person skilled in the art will appreciate that the diffusion medium 510 is an embodiment of a non-woven diffusion medium. The invention is not limited in this regard and any other non-woven diffusion medium can be used without limitation.

Multi-Layer Medium Architectures

Figure 6A:
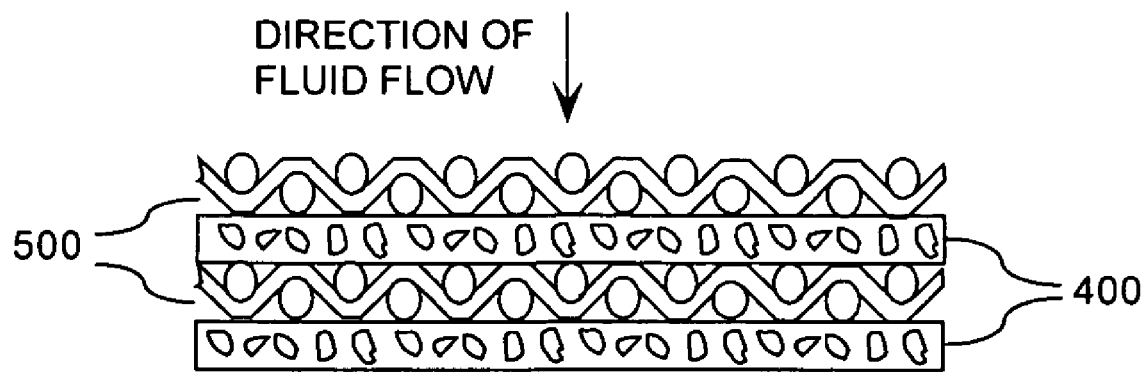
FIG. 6A is a greatly enlarged view of a filter material comprising alternating layers including the adsorbent medium of FIG. 4 and a diffusion medium of FIG. 5A-FIG. 5B according to an embodiment of the invention.

Referring now to FIG. 6A, a greatly enlarged view of a multi-layer medium architecture is shown. According to an embodiment of the invention, the multi-layer medium architecture can comprise alternating layers including the adsorbent medium 400 of FIG. 3 and a diffusion medium 500 shown in FIG. 5A-FIG. 5B. Although two (2) diffusion mediums and two (2) adsorbent mediums are shown in FIG. 6A, the multi-layer medium can include one or more adsorbent mediums 400 and/or diffusion mediums 500.

Figure 6B:
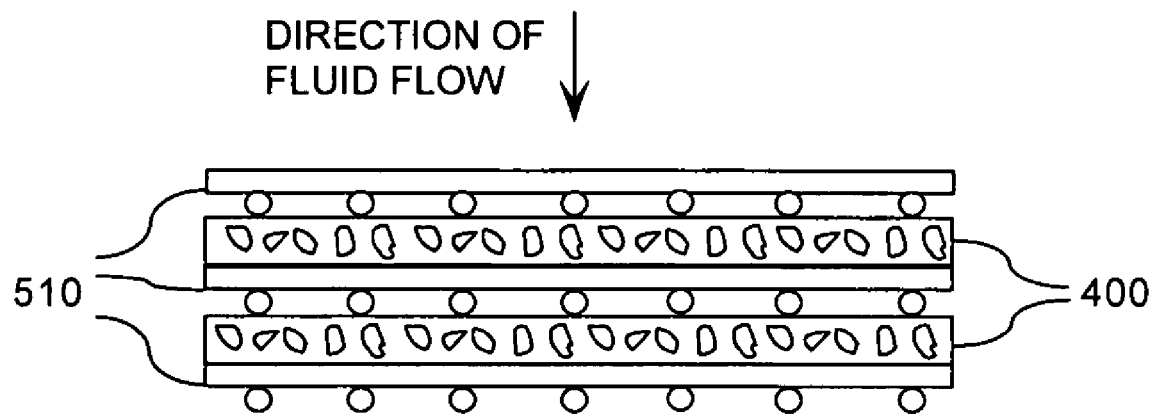
FIG. 6B is a greatly enlarged view of a filter material comprising alternating layers including the adsorbent medium of FIG. 4 and a diffusion medium of FIG. 5C-FIG. 5D according to an embodiment of the invention.

Referring now to FIG. 6B, a greatly enlarged view of a multi-layer medium architecture is shown. According to an embodiment of the invention, the multi-layer medium architecture can comprise alternating layers including the adsorbent medium 400 of FIG. 3 and a diffusion medium 510 shown in FIG. 5C-FIG. 5D. Although three (3) diffusion mediums and two (2) adsorbent mediums are shown in FIG. 6B, the multi-layer medium can include one or more adsorbent mediums 400 and/or diffusion mediums 510.

A person skilled in the art will appreciate that the multi-layer medium architectures of FIG. 6A and FIG. 6B are embodiments of a multi-layer medium architectures. The invention is not limited in this regard and any other multi-layer medium architecture can be used without limitation. For example, a pre-filtration layer can include a multi-layer architecture having one or more layers of a pre-filtering medium, an adsorbent medium, and/or a diffusion medium. Similarly, a filtration layer can include a multi-layer architecture having one or more layers of a filtering medium, an adsorbent medium, and/or a diffusion medium.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A filter bag for use in a pressurized liquid filtering system for filtering a fluid containing contaminants having a predetermined size, comprising:
    a ring member; and
    a filter bag configured to withstand high pressures, said filter bag formed from a plurality of layers that are coextensive with a surface of said filter bag, said filter bag having a tubular form that is closed at one end and affixed at a periphery of said tubular form to said ring member at an opposing end to define an input orifice of said filter bag, said plurality of layers including at least one pre-filtration layer, at least one filtration layer, and at least one post-filtration support layer, said plurality of layers collectively secured together with at least one weld to form said filter bag and specifically configured for filtration of particle contaminants of said predetermined size;
    wherein said pre-filtration layer defines an innermost layer of said filter bag and is comprised of at least one of a monofilament material and a micro-fiber material for collecting particles from a fluid being pumped through the filter bag,
    said at least one filtration layer is comprised of alternating layers of an adsorbent medium, an absolute-rated micro-fiber medium and a diffusion medium, said adsorbent medium formed of at least one layer of a thin wall substrate, and a granular material distributed on a surface of said at least one thin wall substrate and formed of a material for removing organic contaminants from the fluid, said granular material fixed to said at least one layer of said thin wall substrate;
    wherein a first layer of said diffusion medium is disposed between two layers of adsorbent medium and a second layer of said diffusion medium is disposed between one of said two layers of adsorbent medium and one layer of absolute-rated micro-fiber medium;
    wherein said first layer of diffusion medium comprises a non-adsorbent mesh material formed of a plurality of spaced apart parallel strands in a first plane and a plurality of spaced apart parallel strands in a second plane which are not parallel to the strands in the first plane, said parallel strands defining passages configured for permitting fluid flow from one side of said diffusion medium to an opposing side, in a direction transverse to said first and second planes, said passages coextensive with and adjacent to a surface of said two layers of adsorbent medium, said passages forming openings in said diffusion medium which are substantially larger than said contaminant of predetermined size to be filtered and configured for diffusing a fluid over a surface area of a second one of said two layers of adsorbent medium downstream from a first one of said two layers of adsorbent medium thereby enhancing an adsorption of organic contaminants by said two layers of adsorbent medium;
    wherein said diffusion medium further comprises first lateral openings defined by adjacent pairs of strands in said first plane and configured to accommodate fluid flow in a first direction aligned with said parallel strands in said first plane, and second lateral openings defined by adjacent pairs of strands in said second plane and configured to accommodate fluid flow in a second direction aligned with said parallel strands in said second plane, a size of said first and second lateral openings limited by a thickness or diameter of said parallel strands in those areas where said lateral openings traverse strands in an adjacent one of said first or second planes so that said lateral openings are substantially smaller in at least one dimension as compared to said passages, wherein said first diffusion medium is configured to provide an increased surface area for collection of said contaminant between layers of adsorbent medium but includes passages that are substantially larger than said contaminant to be filtered from said fluid; and said post filtration support layer is placed downstream from said filtration layer so that said post filtration support layer defines an outermost layer of said filter bag, said post filtration support layer being comprised of a fibrous fabric for preventing fiber migration downstream.

2. The filter bag according to claim 1, wherein said granular material is fixed between two opposing layers of said thin wall substrate.

3. The filter bag according to claim 2, wherein said granular material is comprised of activated carbon particles.

4. The filter bag according to claim 1, wherein said at least one filtration layer is further comprised of a filter medium layer that is formed of synthetic fibers for collecting particles of contaminants from a fluid being pumped through the filter bag.

5. The filter bag according to claim 4, wherein said at least one filtration layer is further comprised of a structural support layer configured for providing structural support to said filter bag.

6. The filter bag according to claim 5, wherein said structural support layer is comprised of a monofilament strand.

7. The filter bag according to claim 1, wherein said at least one pre-filtration layer is located on an interior side of said filter bag relative to said at least one filtration layer.

8. The filter bag according to claim 7, wherein said at least one pre-filtration layer is comprised of a pre-filtering material that is coextensive with an entire surface of said filter bag, said at least one pre-filtration layer is comprised of at least one layer of said adsorbent medium.

9. The filter bag according to claim 1, wherein said at least one post-filtration support layer is disposed on a portion of said filter bag exterior of said at least one filtration layer.

10. The filter bag according to claim 9, wherein said at least one post-filtration support layer comprises a support jacket formed of a fibrous jacket that is co-extensive with the surface area of the filter bag, said fibrous jacket configured to support said filter bag and prevent downstream migration of fibers from said at least one filtration layer and said at least one pre-filtration layer.

11. A filter bag for use in a pressurized liquid filtering system for filtering a fluid containing contaminants having a predetermined size comprising:

a ring member; and a filter bag configured to withstand high pressures, said filter bag formed from a plurality of layers that are coextensive with a surface of said filter bag, said filter bag having a tubular form that is closed at one end and affixed at a periphery of said tubular form to said ring member at an opposing end to define an input orifice of said filter bag, said plurality of layers including at least one pre-filtration layer, at least one filtration layer, and at least one post-filtration support layer, said plurality of layers collectively secured together with at least one weld to form said filter bag and specifically configured for filtration of particle contaminants of said predetermined size;

wherein said pre-filtration layer defines an innermost layer of said filter bag and is comprised of at least one of a monofilament material and a micro-fiber material for collecting particles from a fluid being pumped through the filter bag, said at least one filtration layer is comprised of a filter medium layer and a plurality of alternating layers of an adsorbent medium, an absolute-rated micro-fiber medium and a diffusion medium, said filter medium layer is formed of synthetic fibers for collecting particles of contaminants from a fluid being pumped through the filter bag, said adsorbent medium is comprised of a granulated material for removing organic contaminants from the fluid fixed between two opposing layers of a highly porous thin wall substrate;

wherein a first layer of said diffusion medium is disposed between two layers of adsorbent medium and a second layer of said diffusion medium is disposed between one of said two layers of adsorbent medium and one layer of absolute-rated micro-fiber medium;

wherein said first layer of said diffusion medium comprises a non-adsorbent mesh material formed of a plurality of spaced apart parallel strands in a first plane and a plurality of spaced apart parallel strands in a second plane which are not parallel to the strands in the first plane, said parallel strands defining passages configured for permitting fluid flow from one side of said diffusion medium to an opposing side, in a direction transverse to said first and second planes, said passages coextensive with and adjacent to a surface of said two layers of adsorbent medium, said passages forming openings in said diffusion medium which are substantially larger than said contaminant of predetermined size to be filtered and configured to diffuse a fluid over a surface area of a second one of said two layers of adsorbent medium downstream from a first one of said two layers of adsorbent medium thereby enhancing an adsorption of organic contaminants by said two layers of adsorption medium;

wherein said diffusion medium further comprises first lateral openings defined by adjacent pairs of strands in said first plane and configured to accommodate fluid flow in a first direction aligned with said parallel strands in said first plane, and second lateral openings defined by adjacent pairs of strands in said second plane and configured to accommodate fluid flow in a second direction aligned with said parallel strands in said second plane, a size of said first and second lateral openings limited by a thickness or diameter of said parallel strands in those areas where said lateral openings traverse strands in an adjacent one of said first or second planes so that said lateral openings are substantially smaller in at least one dimension as compared to said passages, wherein said first diffusion medium is configured to provide an increased surface area for collection of said contaminant between layers of adsorbent medium but includes passages that are substantially larger than said contaminant to be filtered from said fluid; and said post filtration support layer is placed downstream from said filtration layer so that said post filtration support layer defines an outermost layer of said filter bag, said post filtration support layer being comprised of a fibrous fabric for preventing fiber migration downstream.

12. The filter bag according to claim 11, wherein said granular material is comprised of activated carbon particles.

13. The filter bag according to claim 11, wherein said at least one filtration layer is further comprised of a structural support layer configured for providing structural support to said filter bag.

14. The filter bag according to claim 13, wherein said structural support layer is comprised of a monofilament strand.

15. A filter bag for use in a pressurized liquid filtering system for filtering a fluid containing contaminants having a predetermined size, comprising:
   a ring member; and
   a filter bag configured to withstand high pressures, said filter bag formed from a plurality of layers that are coextensive with a surface of said filter bag, said filter bag having a tubular form that is closed at one end and affixed at a periphery of said tubular form to said ring member at an opposing end to define an input orifice of said filter bag, said plurality of layers including at least one pre-filtration layer, at least one filtration layer, and at least one post-filtration support layer, said plurality of layers collectively secured together with at least one weld to form said filter bag and specifically configured for filtration of particle contaminants of said predetermined size;
   wherein said pre-filtration layer defines an innermost layer of said filter bag and is comprised of at least one of a monofilament material and a micro-fiber material for collecting particles from a fluid being pumped through the filter bag,
   said at least one filtration layer is comprised of a plurality of alternating layers of an adsorbent medium, an absolute-rated micro-fiber medium and a diffusion medium, said adsorbent medium formed of at least one layer of a thin wall substrate, and a granular material formed of a material for removing organic contaminants from the fluid, said granular material embedded in a plurality of fibers of said thin wall substrate, and wherein a first layer of said diffusion medium is disposed between two layers of adsorbent medium and a second layer of said diffusion medium is disposed between one of said two layers of adsorbent medium and one layer of absolute-rated micro-fiber medium;
   wherein said first layer of said diffusion medium comprises a non-adsorbent mesh material formed of a plurality of spaced apart parallel strands in a first plane and a plurality of spaced apart parallel strands in a second plane which are not parallel to the strands in the first plane, said parallel strands defining passages configured for permitting fluid flow from one side of said diffusion medium to an opposing side, in a direction transverse to said first and second planes, said passages coextensive with and adjacent to a surface of said two layers of adsorbent medium, said passages forming openings in said diffusion medium which are substantially larger than said contaminant of predetermined size to be filtered and configured to diffuse a fluid over a surface area of a second one of said two layers of adsorbent medium downstream from a first one of said two layers of adsorbent medium thereby enhancing an adsorption of organic contaminants by said two layers of adsorbent medium;
   wherein said diffusion medium further comprises first lateral openings defined by adjacent pairs of strands in said first plane and configured to accommodate fluid flow in a first direction aligned with said parallel strands in said first plane, and second lateral openings defined by adjacent pairs of strands in said second plane and configured to accommodate fluid flow in a second direction aligned with said parallel strands in said second plane, a size of said first and second lateral openings limited by a thickness or diameter of said parallel strands in those areas where said lateral openings traverse strands in an adjacent one of said first or second planes so that said lateral openings are substantially smaller in at least one dimension as compared to said passages, wherein said first diffusion medium is configured to provide an increased surface area for collection of said contaminant between layers of adsorbent medium and wherein said passages are substantially larger than said contaminant to be filtered from said fluid; and
   said post filtration support layer is placed downstream from said filtration layer so that said post filtration support layer defines an outermost layer of said filter bag, said post filtration support layer being comprised of a fibrous fabric for preventing fiber migration downstream.

16. The filter bag of claim 15, wherein said granular material is comprised of activated carbon or activated charcoal.

* * * * *